No. 626,642. Patented June 6, 1899.
W. H. WAKFER.
DRIVING GEAR FOR CYCLES.
(Application filed July 8, 1898.)
(No Model.) 2 Sheets—Sheet 1.
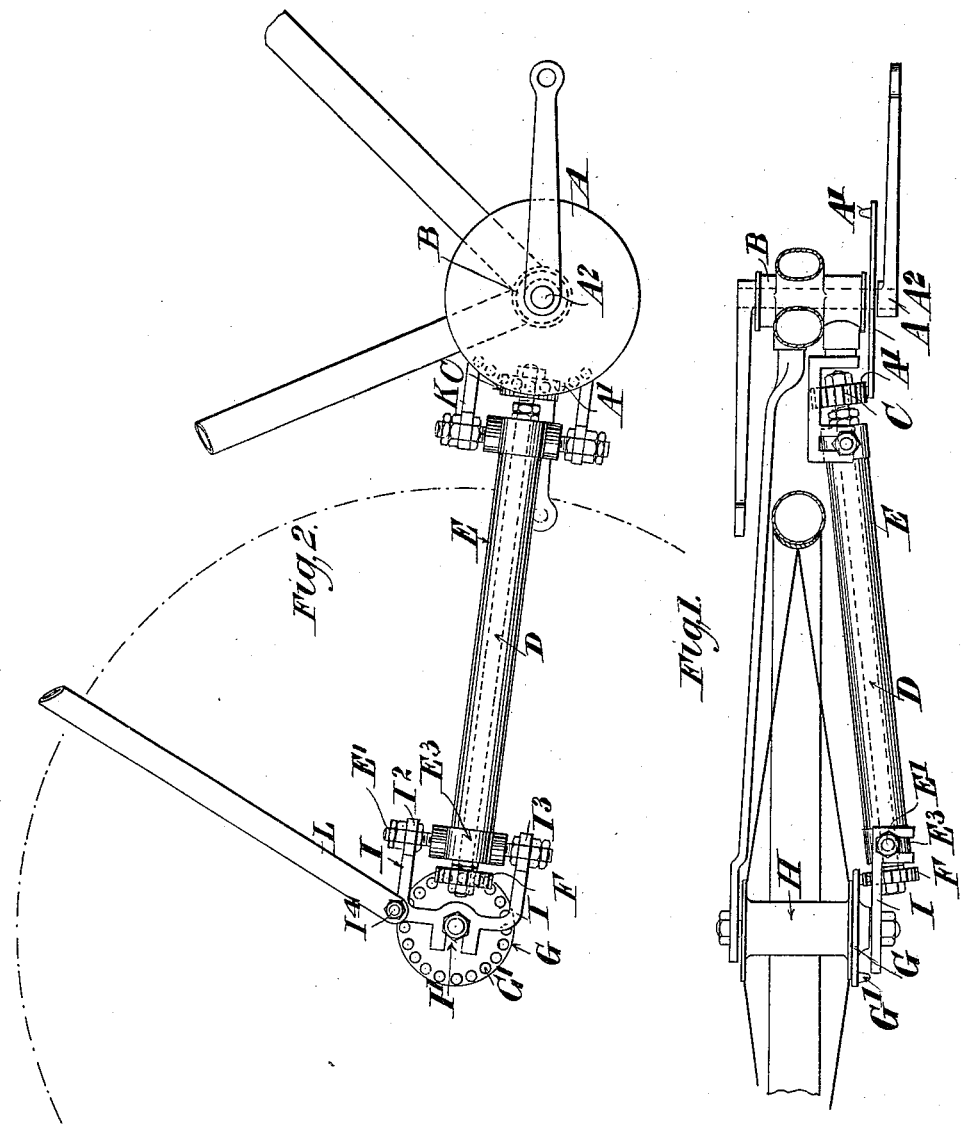

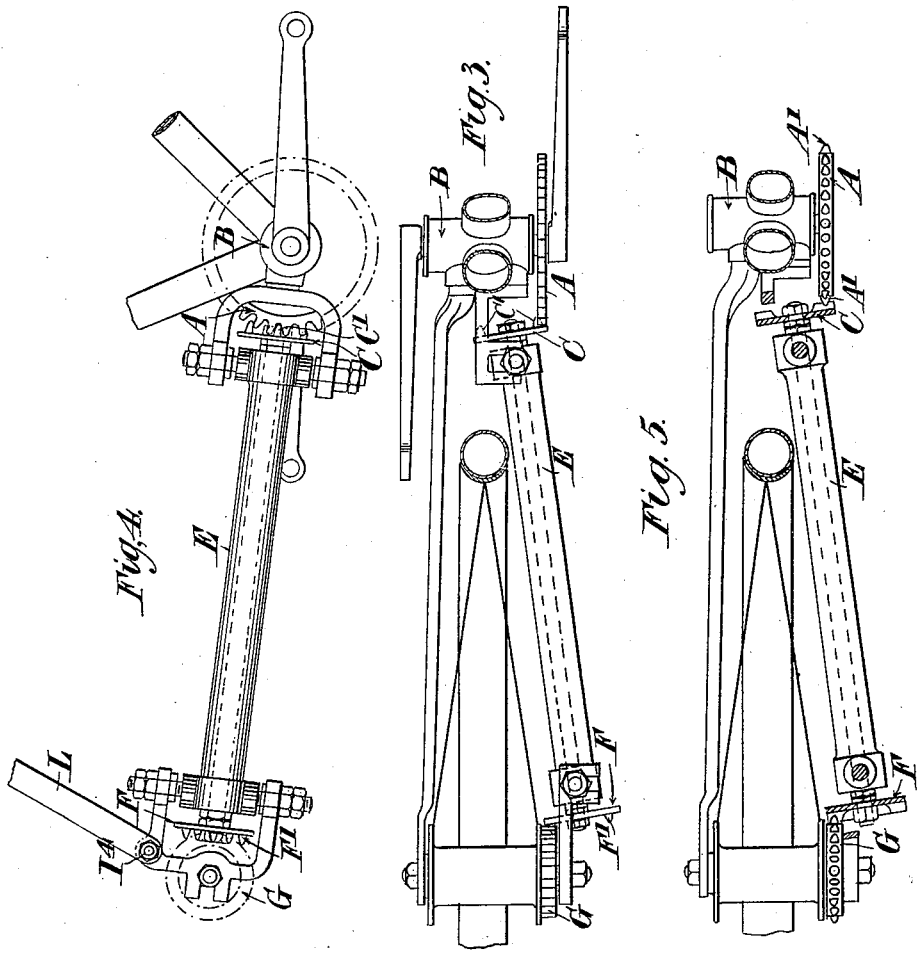

UNITED STATES PATENT OFFICE.

WILLIAM HENRY WAKFER, OF LONDON, ENGLAND.

DRIVING-GEAR FOR CYCLES.

SPECIFICATION forming part of Letters Patent No. 626,642, dated June 6, 1899.

Application filed July 8, 1898. Serial No. 685,387. (No model.)

*To all whom it may concern:*

Be it known that I, WILLIAM HENRY WAKFER, engineer, a subject of the Queen of Great Britain and Ireland, residing at No. 16 Hermitage road, Green Lanes, London, in the county of Middlesex, England, have invented certain new and useful Improvements in and Connected with Driving-Gear for Cycles, Motor-Cars, and the Like; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

My invention refers to driving-gear which is principally applicable to cycles, but which may also be applied to motor-cars and the like; and my invention relates particularly to means for adjusting such gear to take up wear and to prevent backlash.

Figure 1 of the accompanying drawings is a part sectional plan view of part of the back wheel and frame of a safety-bicycle of the usual type provided with driving-gear constructed according to my invention, and Fig. 2 is an elevation thereof. Fig. 3 is a part sectional plan view of a bicycle provided with a modified construction of driving-gear. Fig. 4 is an elevation thereof, and Fig. 5 is a part sectional plan view of yet another modification.

Referring to Figs. 1 and 2, it will be seen that in, for instance, a safety-bicycle I dispense with the ordinary chain and sprocket-wheels, as generally used heretofore, and substitute gearing consisting of a spur-wheel A, having teeth A' on one side, which teeth are preferably made stud-like or in more or less conical form, with a rounded apex. This wheel A is mounted on the motive or crank shaft $A^2$ in the bottom bracket B and gears with a pinion or spur-wheel C, mounted on one end of a spindle D. The spindle D is suitably mounted in ball-bearings contained at each end of an outer inclosing tube E, which is substituted for one of the ordinary fork members. At the other end of the spindle D, nearest the hub of the driving-wheel, I mount another spur-wheel or pinion F, which gears with a spur-wheel G, having teeth G' on one side, similar to those described with reference to the wheel A. The spur-wheel G is mounted on or formed in one with the hub H of the driving-wheel of the vehicle. The spindle D, which is, as aforesaid, mounted in the tube E, is provided at each end with brackets I and K. The bracket I is suitably provided with a slot I', in which the pin or axle of the driving-wheel is clamped in the usual way, and there are also two slotted lugs $I^2$ and $I^3$ at right angles to the body of the bracket for the attachment of the studs E' and $E^2$, fixed to or made in one with a collar $E^3$ on the tube E. The backstay L is suitably bolted or attached at $I^4$ to the bracket I. The bracket K is similar to the bracket I, except that it is brazed or otherwise fixed in position to the bottom bracket B. It is therefore apparent that the driving-wheel may be fixed nearer to or farther from the bottom bracket, and the angularity of the spindle D (and with it its wheels C and F) may be varied in what may be roughly called the "horizontal" and "vertical" planes. By this means the wheels A and C and the wheels F and G may be adjusted to gear more or less tightly and in different relative positions and whereby the backlash is taken up at the same time if and when necessary.

Figs. 3 and 4 represent a modification in which the general arrangement is the same, but the wheel A on the crank-axle is provided with ordinary teeth at the edge, and the wheel C on the spindle running in the tube E has stud-like teeth C' on one side. The wheel F is also provided with stud-like teeth F' on one side and gears with the wheel G, which has ordinary teeth on the edge.

Fig. 5 shows yet another modification in which the general arrangement is the same, but the wheel A on the crank-axle is provided with stud-like teeth A' at the edge, and the wheel C on the spindle running in the tube E has ordinary teeth on one side. The wheel F is also provided with ordinary teeth on one side and gears with the wheel G, which has stud-like teeth on the edge.

It is evident that it is possible, by merely removing one of the fork members of the frame of a safety-bicycle as now constructed and by adding the brackets I and K, the spindle D, and the gearing, to convert a chaindriven bicycle into a chainless cycle without otherwise interfering with the rest of the machine.

I claim—

1. In a gear-driven cycle, the combination with the crank-spindle, a gear-wheel thereon, the driving-wheel spindle, the driving-wheel loose thereon, a gear-wheel on the hub of said driving-wheel, a transmitting-shaft, a gear-wheel at each end thereof, said gear-wheels gearing with the wheels on the crank-spindle and driving-wheel respectively; of a tubular bearing provided near each end with two radial screw-threaded studs, two forked brackets each having slotted lugs at right angles to their bodies for the reception of the aforesaid studs and suitable nuts on said studs, substantially as and for the purpose set forth.

2. In a gear-driven cycle, the combination with the crank-spindle, a gear-wheel thereon, the driving-wheel spindle, the driving-wheel loose thereon, a gear-wheel on the hub of said driving-wheel, a transmitting-shaft, a gear-wheel on each end thereof, said gear-wheels being adjustable longitudinally on said transmitting-shaft and gearing with the wheels on the crank-spindle and driving-wheel respectively; of a tubular bearing provided near each end with two radial screw-threaded studs, two forked brackets having each slotted lugs at right angles to their bodies for the reception of the aforesaid studs and suitable nuts on said studs, substantially as and for the purpose set forth.

3. In a gear-driven cycle, the combination with the crank-spindle, a gear-wheel thereon, the driving-wheel spindle, the driving-wheel loose thereon, a gear-wheel on the hub of said driving-wheel, a transmitting-shaft, a gear-wheel at each end thereof in gear with the wheels on the crank-spindle and driving-wheel respectively, one of each pair of geared wheels provided with stud-like conical teeth; of a tubular bearing provided near each end with two radial screw-threaded studs, two forked brackets having slotted lugs at right angles to its body for the reception of the aforesaid studs, and suitable nuts on said studs, the driving-wheel adjustable in one of said brackets toward and from the crank-spindle, substantially as and for the purpose set forth.

In testimony that I claim the foregoing as my invention I have signed my name in presence of two subscribing witnesses.

WILLIAM HENRY WAKFER.

Witnesses:
T. JENSEN,
WALTER J. SKERTEN.